US010277563B2

(12) United States Patent
Rao et al.

(10) Patent No.: US 10,277,563 B2
(45) Date of Patent: Apr. 30, 2019

(54) COMPUTER-IMPLEMENTED SYSTEM AND METHOD FOR PROTECTING SENSITIVE DATA VIA DATA RE-ENCRYPTION

(71) Applicant: Palo Alto Research Center Incorporated, Palo Alto, CA (US)

(72) Inventors: Vanishree Rao, Mountain View, CA (US); Shantanu Rane, Menlo Park, CA (US); Ersin Uzun, Campbell, CA (US); Alejandro E. Brito, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 303 days.

(21) Appl. No.: 15/185,575

(22) Filed: Jun. 17, 2016

(65) Prior Publication Data

US 2017/0366519 A1    Dec. 21, 2017

(51) Int. Cl.
*H04L 29/06* (2006.01)
*G06F 17/30* (2006.01)
*H04L 9/00* (2006.01)
*H04L 9/30* (2006.01)

(52) U.S. Cl.
CPC .... *H04L 63/0464* (2013.01); *G06F 17/30554* (2013.01); *H04L 9/008* (2013.01); *H04L 63/0435* (2013.01); *H04L 63/0442* (2013.01); *H04L 63/061* (2013.01); *H04L 63/0876* (2013.01); *H04L 9/3073* (2013.01); *H04L 2209/76* (2013.01)

(58) Field of Classification Search
CPC . H04L 63/0464; H04L 9/008; H04L 63/0876; H04L 63/061; H04L 63/0442; H04L 63/0435; H04L 2209/76; H04L 9/3073; G06F 17/30554
See application file for complete search history.

(56) References Cited

U.S. PATENT DOCUMENTS

2016/0380767 A1    12/2016    Hayashi et al.

FOREIGN PATENT DOCUMENTS

| EP | 2924911 | 9/2015 | |
| EP | 2924911 A1 * | 9/2015 | ............ H04L 9/008 |
| WO | 2016/051591 | 4/2016 | |
| WO | WO-2016051591 A1 * | 4/2016 | ............... H04L 9/14 |

OTHER PUBLICATIONS

Sara Foresti, "Overview of the State of the Art," Preserving Privacy in Data Outsourcing, 2011, pp. 9-30, vol. 51.
(Continued)

*Primary Examiner* — Simon P Kanaan
(74) *Attorney, Agent, or Firm* — Krista A. Wittman

(57) ABSTRACT

A computer-implemented method for protecting sensitive data via data re-encryption is provided. Encrypted data is maintained. A data query is received from a user associated with a public key and a secret key. Results of the query are computed by identifying at least a portion of the encrypted data and by adding plaintext for the identified portion of the encrypted data as the results. A re-encryption key is generated for the results using the public key of the user and the results are re-encrypted using the re-encryption key. The re-encrypted results are then transmitted to the user.

18 Claims, 8 Drawing Sheets

(56) References Cited

OTHER PUBLICATIONS

Boneh et al., "Evaluating 2-DNF Formulas on Ciphertexts," Theory of Cryptography, Second Theory of Cryptography Conference, TCC 2005, Cambridge, MA, USA, 2005, Proceedings, vol. 3378 of Lecture Notes in Computer Science, Springer, 2005, pp. 325-341.
Damgard et al., "A Generalization of Paillier's Public-Key System with Applications to Electronic Voting," International Journal of Information Security, 9(6):371-385, 2010.
Gentry et al., "Fully Homomorphic Encryption Using Ideal Lattices," STOC, 2009, pp. 169-178, vol. 9.
Hohenberger et al., "Securely Obfuscating Re-Encryption," Theory of Cryptography, Springer, 2007, pp. 233-252.
P. Paillier, "Public-Key Cryptosystems Based on Composite Degree Residuosity Classes," Advances in Cryptology, EUROCRYPT99, 1999, pp. 223-238.
Popa et al., "Cryptdb: Protecting Confidentiality with Encrypted Query Processing," Proceedings of the Twenty-Third ACM Symposium on Operating Systems Principles, ACM, 2011, pp. 85-100.
Rivest et al., "A Method for Obtaining Digital Signatures and Public-Key Cryptosystems," Communications of the ACM, 1978, 21(2)120-126.

\* cited by examiner

COMPUTER-IMPLEMENTED SYSTEM AND METHOD FOR PROTECTING SENSITIVE DATA VIA DATA RE-ENCRYPTION

FIELD

This application relates in general to data encryption, and in particular to a computer-implemented system and method for protecting sensitive data via data re-encryption.

BACKGROUND

Companies tend to collect large amounts of data during the normal course of business. At least a portion of the data includes sensitive information, such as financial transactions, medical profiles, and customer identification, including social security numbers. Once collected, the companies must store the data, sometimes for long amounts of time, as required by company policy or by government guidelines and policies. However, a majority of the companies are unable to store the data themselves due to the considerable amount of storage space required and thus, rely on leasing storage and computing power from larger companies. Servers used by the larger companies to store the data are public and often cloud based.

Additionally, the field of business intelligence depends on analytics to identify trends, steer strategies, and support successful business practices. The analysis is commonly performed by analysts hired by a company. These analysts are generally entrusted with important tools, including decryption keys to decrypt the stored data prior to analysis. However, if an unauthorized individual, such as the adversary obtains the decryption key, access to the entire database storing the data is granted. Unfortunately, mobile devices of the analysts are often not equipped with strong intrusion prevention mechanisms, which make the analysist a weak link for attack by an adversary.

Protecting data owners' sensitive information from unauthorized individuals is extremely important to prevent misappropriation of the data. Currently, sensitive data can be protected via an access control mechanism at a server on which the data is stored so that the server first engages with a party interested in the data and then requires the interested party to enter necessary credentials to pass authentication protocols established by the access control mechanism before accessing the data. Unfortunately, a number of security breaches has recently increased due to unauthorized access of the credentials for an authorized user.

In addition to requiring a user to enter credentials, stored data can be encrypted prior to storage as an additional security layer to reduce the effects of breach by preventing access to the data content. However, encryption itself is generally not secure enough to prevent disclosure of the data content. For instance, to encrypt the data, companies generally utilize a public key to encrypt the data prior to storage. Subsequently, a user associated with the company needs to access the data, but to do so, must obtain a secret key of the company to decrypt the encrypted data. Allowing multiple users of the company access to the secret key places the data in a vulnerable position since the user can provide the key to unauthorized users. Additionally, the secret key can be accessed directly by unauthorized users, resulting in access to the data content. Unfortunately, obtaining a secret key can be fairly easy since humans are often easily fooled by simple social engineering attacks.

Therefore, there is a need for an approach to improved data protection and breach prevention. Preferably, the data protection and breach prevention will include a re-encryption scheme for large amounts of plaintext data to reduce the effects of unauthorized access to the data itself or via individuals authorized to access the data.

SUMMARY

A secure cloud-computing architecture can be used to increase security of sensitive data and reduce opportunities for breach over conventional security methods. Public and secret encryption keys can be generated for a data owner storing sensitive data on a cloud based server and for each individual authorized to access the data. Prior to storage, the data is encrypted using the data owner's public key. A user can submit a query to access the encrypted data and results of the query are determined based on the stored encrypted data. A re-encryption key is generated for the requesting user using his public key. The encrypted data results, which are in ciphertext form, are then re-encrypted to a different ciphertext form, using the re-encryption key. The re-encrypted results are provided to the requesting individual and then decrypted for analysis and further use. Specifically, decryption of the re-encrypted ciphertext reveals the underlying plaintext, namely the query result.

An embodiment provides a computer-implemented method for protecting sensitive data via data re-encryption. Encrypted data is maintained. A data query is received from a user associated with a public key and a secret key. Results of the query are computed by identifying at least a portion of the encrypted data and by adding plaintext for the identified portion of the encrypted data as the results. A re-encryption key is generated for the results using the public key of the user and the results are re-encrypted using the re-encryption key. The re-encrypted results are then transmitted to the user.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Companies collect and store large amounts of data. Hired analysts can analyze the collected data, such as for use in business intelligence. However, analysts are often considered to be a weak link since each is trusted with extremely important tools, such as a decryption key to decrypt encrypted data prior to analysis. Unfortunately, most of the analysts are not equipped with strong intrusion prevention mechanisms and thus, attacks are common. Separately encrypting data for each data owner and re-encrypting the data for a particular user authorized by a data owner, helps prevent breach of the data due to unauthorized access to the server, untrustworthy users, or attacks on a user privy to security information of the data.

Figure 1:
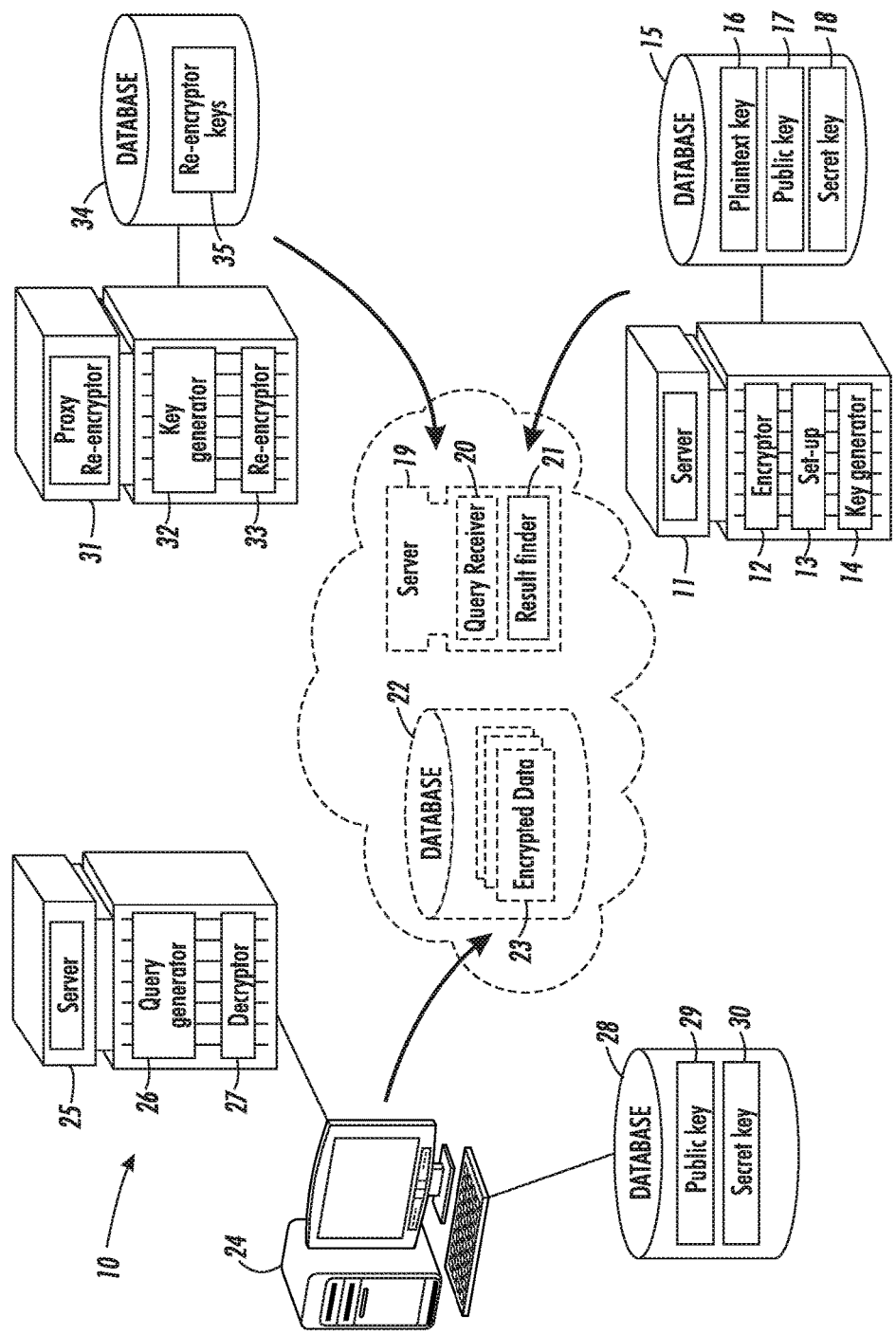
FIG. 1 is a block diagram showing a computer-implemented system for protecting sensitive data via data re-encryption, in accordance with one embodiment.

Re-encryption facilitates that a decryption key, used to decrypt an encrypted database, no longer resides at the endpoints. FIG. 1 is a block diagram showing a computer-implemented system 10 for protecting sensitive data via data re-encryption, in accordance with one embodiment. Over time, a data owner can collect large amounts of data 16 during the normal course of business, which can be originally stored on a local database 15 that is interconnected to a server 11 associated with the owner. The data 16 can include documents, messages, voice recordings, video clips, medical records, financial transactions, and location data, as well as other types of data. The database 15 can also include a public key 17 and secret key 18 for the data owner.

The server 11 includes an encryptor 12, set-up module 13, and key generator 14. The encryptor 12 utilizes the public key of the data owner to encrypt the data 16 stored on the database 15. Once encrypted, the data 23 is transmitted for storage in a database 22 associated with a cloud based server 19. Cloud based storage offers extremely large amounts of storage space, which relieves data owners of the burden of storing all data locally. To access the encrypted data 23 from the cloud based servers, authorized users are each associated with a public key 29 and a secret key 30, where the public key can be maintained in a database 28 associated with a computing device 24 of that user. Alternatively, the public 29 key can be stored on in a database of a cloud based server. The users' public 29 and secret 30 keys can be generated by the owner's server 11 via the set up module 13, which outputs parameters that can be used by the key generator 14 to generate the keys for each user authorized to access the data 23, as further described below with reference to FIG. 3.

Each authorized user can access the owner's encrypted data 23 via the computing device 24, such as a desktop or laptop computer, as well as a mobile device, for performing analytics on the data. Specifically, the computing device 24 is associated with a server 25 having a query generator 26 to generate the query and a decryptor 27. The query is transmitted to the cloud based server 19, which includes a query receiver 20 to receive and parse the query, and a result finder 21 that processes the encrypted data 23 in response to the query and generates one or more encrypted results. The results of the query are computed by adding the underlying plaintext of the results. However, prior to providing the encrypted results to the user, the results are transmitted to a proxy re-encryption server 31, which includes a key generator 32 and a re-encryptor 33. The key generator 32 generates a re-encryption key 35 for each authorized user based on the secret key of the data owner and the public key of that requesting user, as described below in further detail with respect to FIG. 6. The re-encryption keys 35 for the users can support additively homomorphic operations in the ciphertext domain and are stored in a database 34 associated with the proxy re-encryptor 31. The re-encryptor 33 re-encrypts ciphertext of the encrypted data results from under the data owner's public key to the requesting user's public key and transmits the re-encrypted results to the requesting user. Once received by the requesting user, the re-encrypted data results can be decrypted using the requesting user's secret key by the decryptor 27. Decryption of the re-encrypted ciphertext reveals the underlying plaintext, namely the query results.

The mobile computing devices and servers can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, as integrated circuitry and each of the client and server can act as a specialized computer. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
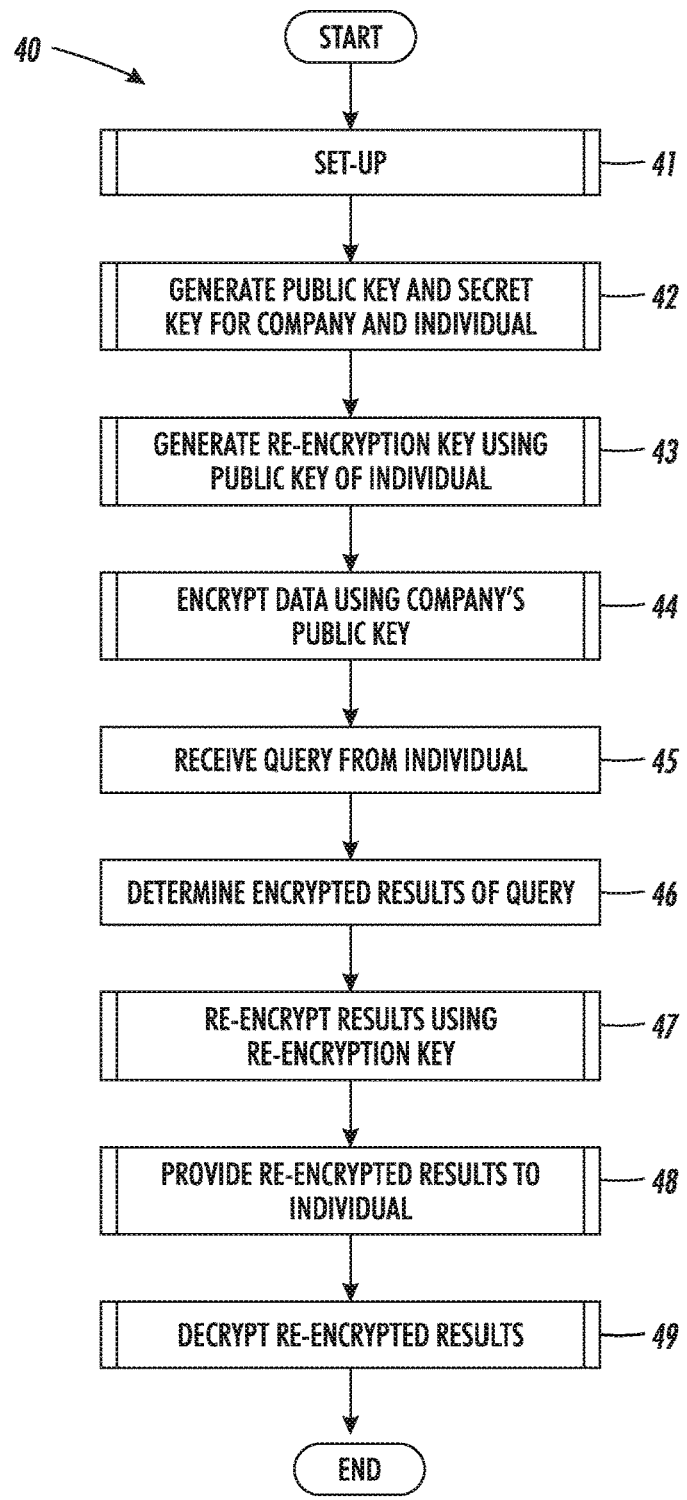
FIG. 2 is a flow diagram showing a computer-implemented method for protecting sensitive data via data re-encryption, in accordance with one embodiment.

Re-encrypting ciphertext helps prevent data breaches, as well as minimizes the effect of any breach that occurs, by preventing the sharing of decryption keys and adding an additional level of security. Specifically, if a re-encryption key is stolen, all the unauthorized user can do with the key is convert the ciphertext from one public key to another. In other words, the unauthorized user is not able to decrypt the ciphertext. FIG. 2 is a flow diagram showing a computer-implemented method 40 for protecting sensitive data via data re-encryption, in accordance with one embodiment. A data owner performs set-up (block 41), including identifying parameters for generating (block 42) public and secret keys for the data owner itself and users authorized to access data of the owner. Generating the parameters are further described below in detail with respect to FIG. 3, while generating the public and secret keys for the data owner and user is further described below with reference to FIG. 4. Simultaneously with or subsequent to set up, re-encryption keys for one or more of the authorized users can be generated (block 43) using that user's public key, as further described below with reference to FIG. 6.

Data collected by the owner can be encrypted (block 44) using the owner's public key and stored on one or more cloud based servers, as further described below with reference to FIG. 5. One or more authorized users can perform analytics on the encrypted data by submitting (block 45) a query for at least a subset of the data. Using an additively homomorphic algorithm and based on the encrypted data, results of the query are computed (block 46) by adding underlying plaintext of the encrypted results that satisfy the query. Prior to providing the results to the requesting user, the results, including the encrypted and plaintext results, are re-encrypted (block 47) using the re-encryption key, as further described below with reference to FIG. 7. The re-encrypted results can then be provided (block 48) to the requesting user and decrypted (block 49) for use by the user, as further described below with reference to FIG. 8.

Figure 3:
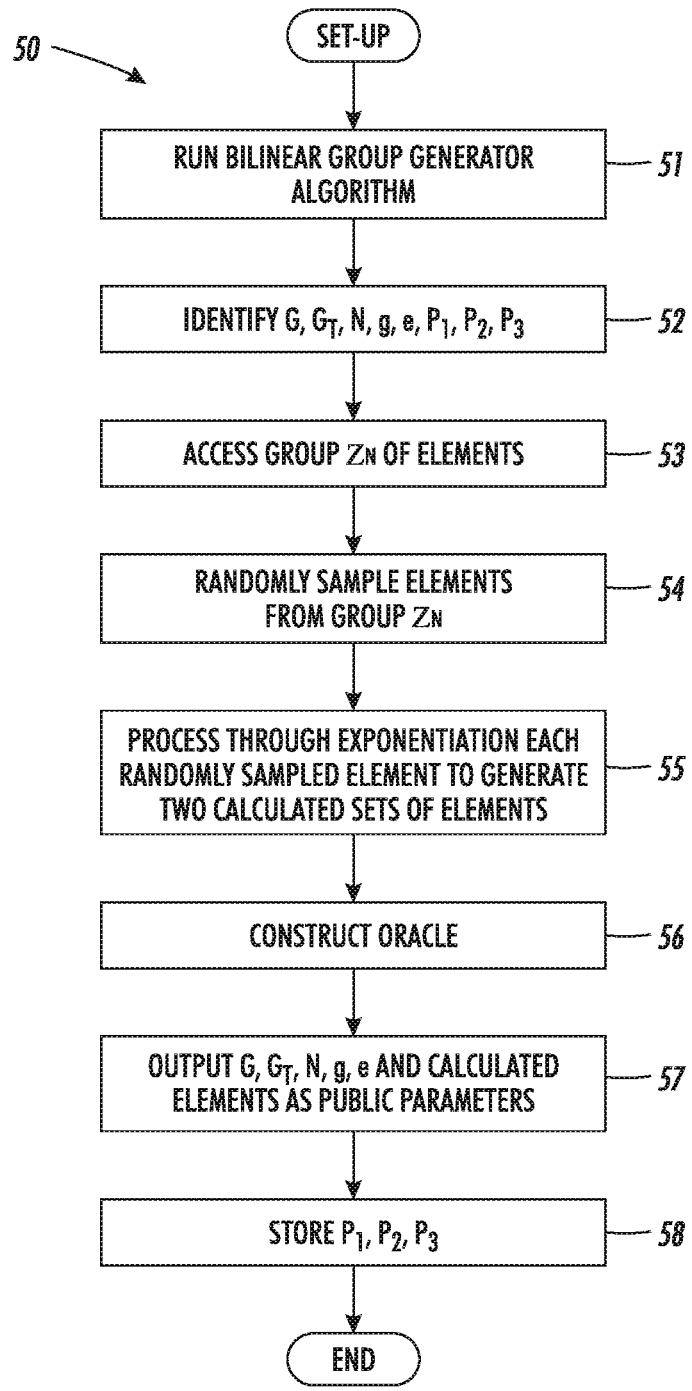
FIG. 3 is a flow diagram showing, by way of example, a process for performing encryption set up.

Each user authorized to access data of an owner is associated with a public key and secret key. The keys of the users should be related based on their common relationship with the data owner. The set-up phase determines parameters for generating the keys, such that the keys of all the authorized users are tied together based on a common set of parameters. FIG. 3 is a flow diagram showing, by way of example, a process 50 for performing encryption set up. During set up, a bilinear group generator algorithm is run (block 51) to identify two multiplicative cyclic groups G and $G_T$, each of order $N=p_1^k p_2^k p_3$. Each of $p_1$, $p_2$, and $p_3$ are distinct prime numbers that are also output via the bilinear group generator algorithm, along with $\dot{g}$, a generator of G, and a bilinear map e: $G \times G \rightarrow G_T$, and k is a positive integer less than N. Thus, once run, the bilinear group generator identifies each of the following parameters: $(\mathbb{G}, \mathbb{G}_T, e, N, \dot{g}, p_1, p_2, p_3)$, where $\dot{g}$ is the group generator.

A set of elements, $Z_N = \{0, 1, \ldots N-1\}$, is accessed (block 53) and two subsets of elements are randomly selected (block 54) from the set $Z_N$. Each randomly selected element is processed (block 55) through exponentiation to generate two calculated sets of elements. For example, two subsets of elements $\alpha_0, \alpha_1, \ldots \alpha_{k-1}$ and $\beta_0, \beta_1, \ldots \beta_{k-1}$ can be randomly selected from the set $Z_N$, and separately employed in the following equations:

$$h_i = (\dot{g}^{p_2^k p_3})^{\alpha_i p_1^i}$$

$$f_i = (\dot{g}^{p_1^k p_2})^{\beta_i p_2^i}$$

to generate parameters $h_0, \ldots, h_{k-1}, f_0, \ldots, f_{k-1}$

Figure 8:
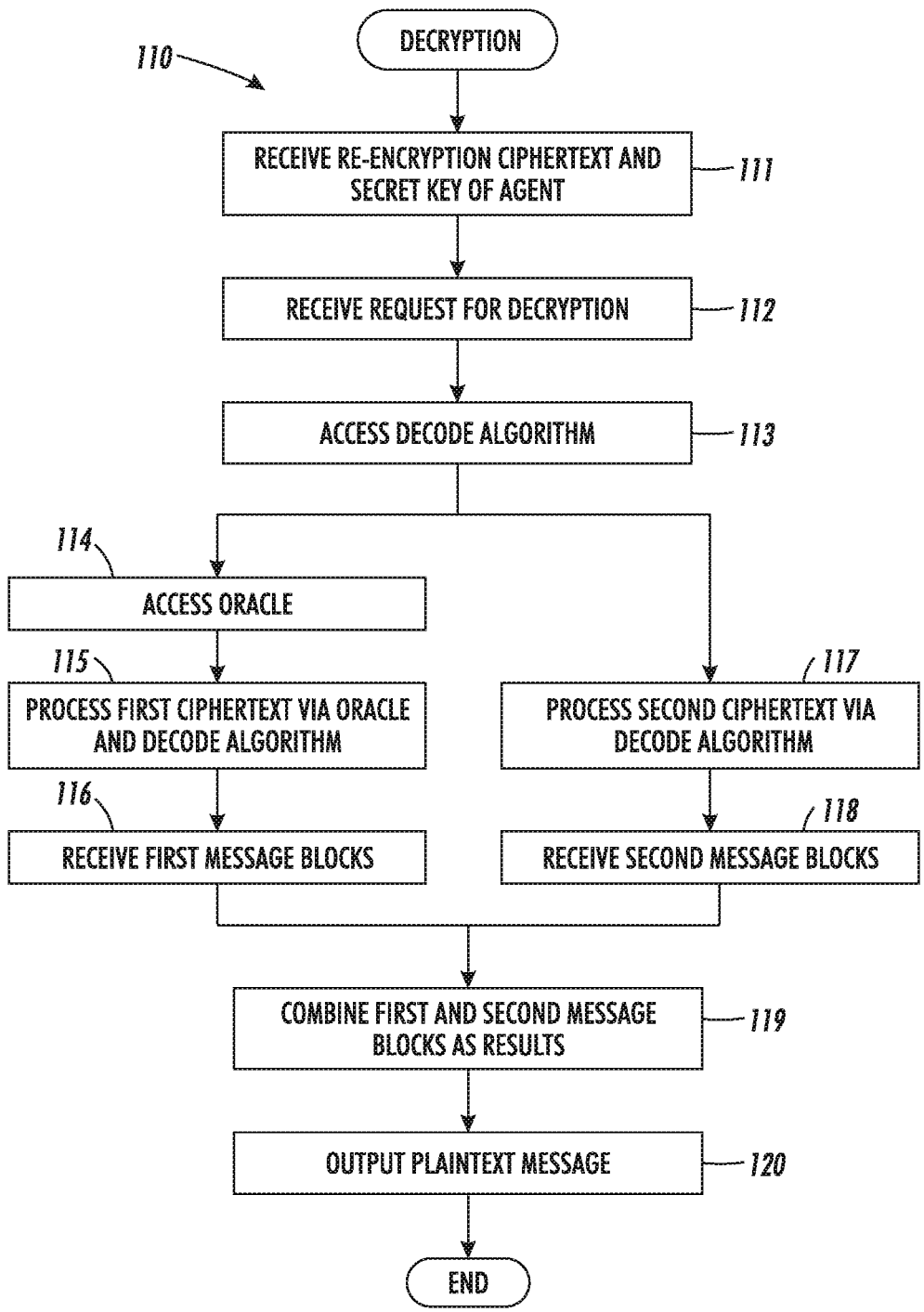
FIG. 8 is a flow diagram showing, by way of example, a process for decrypting ciphertext.

Also during the set-up phase, a decryption oracle is constructed (block 56) for use with a decode algorithm to decrypt encrypted and re-encrypted ciphertext using one of the prime numbers, as further described below with reference to FIG. 8. Finally, parameters G, $G_T$, N, g, e, and the calculated groups of parameters $h_0, \ldots, h_{k-1}, f_0, \ldots, f_{k-1}$ are output as public parameters (block 57), while $p_1$, $p_2$, and $p_3$ are stored (block 58) by the data owner as private parameters.

Figure 4:
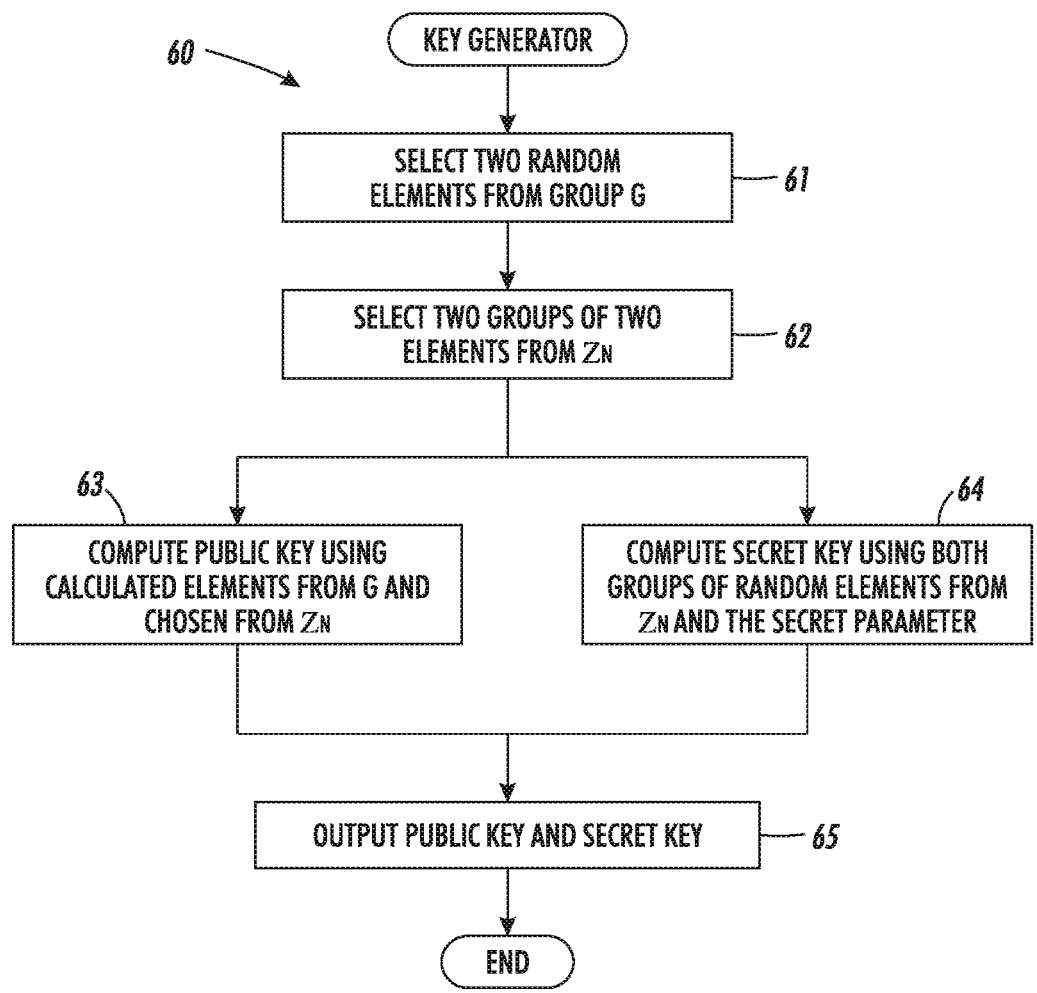
FIG. 4 is a flow diagram showing, by way of example, a process for generating public and secret keys.

Once set-up has been performed, public keys and secret keys for the data owner and one or more users can be generated. For example, upon hiring a new employee, a public and secret key can be generated for the employee to access the encrypted data stored on a cloud based server and owned by the employer. FIG. 4 is a flow diagram showing, by way of example, a process 60 for generating public and secret keys. Group G is accessed from the public set-up parameters and two elements from the group are randomly selected (block 61). In one embodiment, the elements can be determined by sampling $\gamma$ and $\tilde{\gamma}$ from group $Z_N$, another public set-up parameter, and then using the group generator $\dot{g}$ from the set up phase as follows, $g = \dot{g}^\gamma$, $\tilde{g} = \dot{g}^{\tilde{\gamma}}$.

Additionally, two groups of two elements each are randomly selected (block 62) from set $Z_N$. For example, $\alpha, \tilde{\alpha} \leftarrow \mathbb{Z}_N$ and $b, \tilde{b} \leftarrow \mathbb{Z}_N$. The public key is computed (block 63) using the random elements from G and the two groups of random elements for $Z_N$. Specifically, the random elements from G and from $Z_N$ are computed to generate $g^a$, $g^b$, $\tilde{g}^{\tilde{a}}$, and $\tilde{g}^{\tilde{b}}$. The public key is then output (block 65) as pk=$((g, g^a, g^b), (\tilde{g}, \tilde{g}^{\tilde{a}}, \tilde{g}^{\tilde{b}}))$.

Meanwhile, the secret key is computed (block 64) based on both groups of random elements selected from $Z_N$ and one of the secret parameters. In one embodiment, $p_1$ is used for the secret parameter; however, another one of the secret parameters can be used. The private key is then output (block 65) as sk=$((a, b, g), (\tilde{a}, \tilde{b}, \tilde{g}), p_1)$. Upon output (block 65), the public and secret keys can be maintained by the data owner, as well as provided to the associated user for accessing stored data. Use of the parameters from the set-up phase can also be used to generate public and secret keys for the data owner using the above identified processes.

Prior to storing data, especially sensitive data, on cloud based servers, the data owner can encrypt the data to help prevent breach, as well as reduce access to the data should breach occur. FIG. 5 is a flow diagram showing, by way of example, a process 70 for encrypting data using the public key of FIG. 4. Data, such as messages, to be encrypted are received (block 71) with a public key of the data owner. Each message is divided (block 72) into segments $M_i$ and each segment is then divided (block 73) into two blocks, $M_i^{[1]}$ and $M_i^{[2]}$. In one embodiment, the message segments are divided using secret sharing; however, other processes for dividing the message segments are possible.

For each message, all of the first message blocks $M_i^{[1]}$ are collected (block 74) and all of the second message blocks $M_i^{[2]}$ are collected (block 77). Subsequently, an encode algorithm is run (blocks 75, 78) separately on the first set of blocks and the second set of blocks. The algorithm for each group of blocks can be run simultaneously or asynchronously. The encode algorithm receives as input the public key of the data owner pk=$((g, g^a, g^b), (\tilde{g}, \tilde{g}^{\tilde{a}}, \tilde{g}^{\tilde{b}}))$ and a message. In one embodiment, the encode algorithm is as follows:

$$\text{Encode}(\{g_i\}_{i=0}^{k-1}, (m_0, \ldots m_{k-1})) = \prod_{i=0}^{k-1} g_i^{m_i}$$

During running of the encode algorithm, two groups of two elements are sampled from $Z_N$, $r, s \leftarrow Z_N$ and $\tilde{r}, \tilde{s} \leftarrow Z_N$, and are used to encode the message. Specifically, the group of first message blocks are encrypted to generate (block 76) ciphertext $C_1$ according to the following equation:

$$C_1 = ((g^a)^r, (g^b)^s, g_{r+s} \cdot \text{Encode}(\{h_i\}_{i=0}^{k-1}, (m_0[1], \ldots, m_{k-1}[1])))$$

where $h_i$ represents a portion of the public parameters identified during the set-up phase, as described above with reference to FIG. 3. Meanwhile, the group of second message blocks are encrypted to generate (block 79) ciphertext $C_2$ according to the following equation:

$$C_2 = ((\tilde{g}^{\tilde{a}})^{\tilde{r}}, (\tilde{g}^{\tilde{b}})^{\tilde{s}}, \tilde{g}^{\tilde{r}+\tilde{s}} \cdot \text{Encode}(\{f_i\}_{i=0}^{k-1}, (m_0[2], \ldots, m_{k-1}[2])))$$

where $f_i$ represents a portion of the public parameters identified during the set up phase, as described above with reference to FIG. 3. Ciphertext for the first message blocks $C_1$ and the second message blocks $C_2$ are then combined (block 80) as the ciphertext $C=(C_1, C_2)$ for the message, which is then output (block 81) as the encrypted message.

Figure 6:
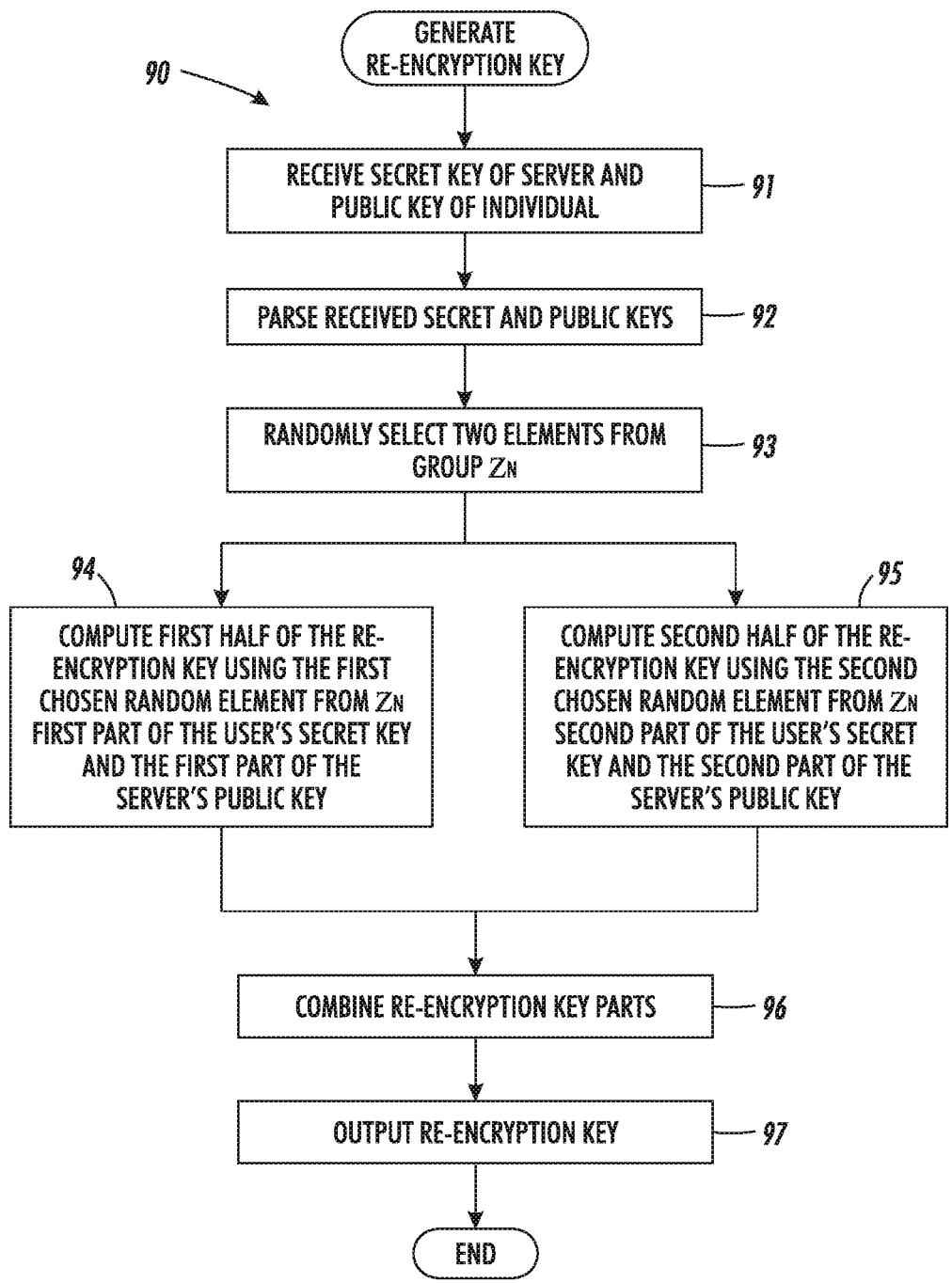
FIG. 6 is a flow diagram showing, by way of example, a process for generating a re-encryption key.

Once the encrypted data is stored, a user can analyze the data by submitting a query. Results of the query can be identified via a cloud based server, for example. However, prior to providing the results to the requesting user, the encrypted results are re-encrypted from under the data owner's public key to under the user's public key. FIG. 6 is a flow diagram showing, by way of example, a process 90 for generating a re-encryption key. The secret key sk=$((a, b, g), (\tilde{a}, \tilde{b}, \tilde{g}), p_1)$ of the data owner and the public key pk=$((g, g^a, g^b), (\tilde{g}, \tilde{g}^{\tilde{a}}, \tilde{g}^{\tilde{b}}))$ of the user are received (block 91) as input. Each of the secret key of the data owner and the public key of the user are parsed (block 92), and two elements are randomly selected (block 93) from the set $Z_N$, z, $\tilde{z} \leftarrow Z_N$. The re-encryption key, $r_k$, is computed in two parts as follows:

$$rk_{S \to R} = ((Z_1, Z_2, Z_3), (\tilde{Z}_1, \tilde{Z}_2, \tilde{Z}_3)),$$

where:

$$(Z_1, Z_2, Z_3) = \left((g_R^{a_R})^{\frac{z}{a_S}}, (g_R^{b_R})^{\frac{z}{b_S}}, g_R^z\right)$$

$$(\tilde{Z}_1, \tilde{Z}_2, \tilde{Z}_3) = \left((\tilde{g}_R^{\tilde{a}_R})^{\frac{\tilde{z}}{\tilde{a}_S}}, (\tilde{g}_R^{\tilde{b}_R})^{\frac{\tilde{z}}{\tilde{b}_S}}, \tilde{g}_R^{\tilde{z}}\right)$$

Specifically, a first half of the re-encryption key is computed (block 94) using the first random element z selected from the set $Z_N$, a first part of the data owner's secret key (a, b, g), and a first part of the user's public key (a, $g^a$, $g^b$). Also, a second half of the reencyption key is computed (block 95) using the second random element $\tilde{z}$ selected from the set $Z_N$, a second part of the data owner's secret key ($\tilde{a}$, $\tilde{b}$, $\tilde{g}$), and a second part of the user's public key ($\tilde{g}$, $\tilde{g}^{\tilde{a}}$, $\tilde{g}^{\tilde{b}}$). Once calculated, the two parts of the reencyption key are combined (block 96) and output (block 97) for reencypting the encrypted data results.

Figure 7:
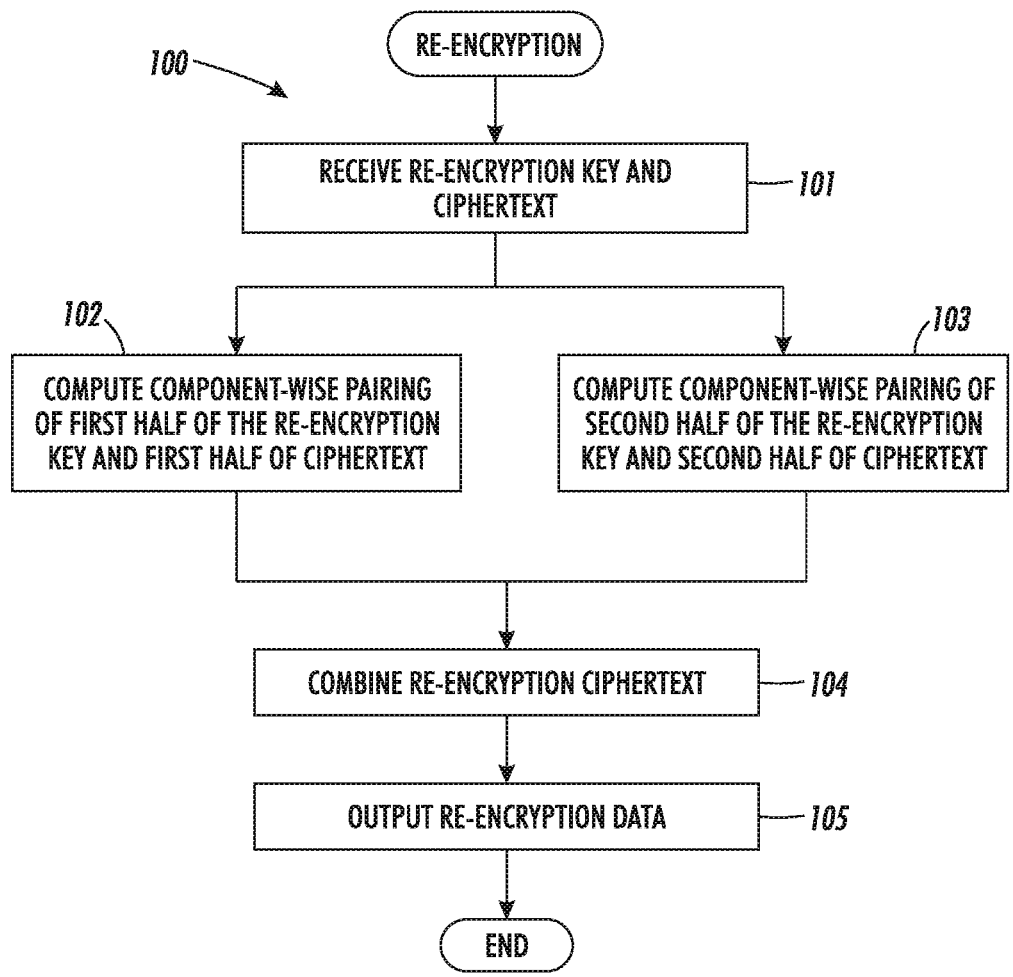
FIG. 7 is a flow diagram showing, by way of example, a process for re-encrypting ciphertext using the re-encryption key of FIG. 6.

Re-encrypting ciphertext of the encrypted data allows a user to decrypt the data using his secret key, rather than the secret key of the data owner, and provides an additional level of security. FIG. 7 is a flow diagram showing, by way of example, a process 100 for re-encrypting ciphertext using the re-encryption key of FIG. 6. The re-encryption key $rk_{S \to R} = ((Z_1, Z_2, Z_3), (\tilde{Z}_1, \tilde{Z}_2, \tilde{Z}_3))$ for the requesting user and ciphertext $C = (C_1, C_2)$ of the encrypted data results are received (block 101) as input. In one embodiment, $C_1 = (W, X, Y)$, where:

$W = (g^a)^r$
$X = (g^b)^s$
$Y = g^{r+s} \cdot \text{Encode}(\{h_i\}_{i=0}^{k-1}, (m_0[1], \ldots, m_{k-1}[1]))$
and $C_2 = (\tilde{W}, \tilde{X}, \tilde{Y})$, where:
$\tilde{W} = (\tilde{g}^{\tilde{a}})^{\tilde{r}}$
$\tilde{X} = (\tilde{g}^{\tilde{b}})^{\tilde{s}}$
$\tilde{Y} = \tilde{g}^{\tilde{r}+\tilde{s}} \cdot \text{Encode}(\{f_i\}_{i=0}^{k-1}, (m_0[2], \ldots, m_{k-1}[2]))$ Component wise pairing of a first half of the re-encryption key and a first half of the ciphertext is computed (block 102) as a first part of the re-encrypted ciphertext as follows:

$E = e(W, Z_1)$
$F = e(X, Z_2)$
$G = e(Y, Z_3)$

Component-wise pairing of the second half of the re-encryption key and the second half of the ciphertext is computed (block 103) as a second part of the re-encrypted ciphertext as follows:

$\tilde{E} = e(\tilde{W}, \tilde{Z}_1)$
$\tilde{F} = e(\tilde{X}, \tilde{Z}_2)$
$\tilde{G} = e(\tilde{Y}, \tilde{Z}_3)$ The first and second parts of the re-encrypted ciphertext are combined (block 104) as $C_R = ((E, F, G), (\tilde{E}, \tilde{F}, \tilde{G}))$ and output (block 105) as the re-encrypted data.

Once the user receives the re-encrypted data results, the secret key of the user can be used to decrypt the re-encrypted data. Additionally, the data owner can decrypt the encrypted data, if necessary, using the data owner's secret key. FIG. 8 is a flow diagram showing, by way of example, a process 110 for decrypting ciphertext. Ciphertext and a decryption key are received (block 111) as input. The ciphertext can be a fresh ciphertext, $C = (C_1, C_2)$, such as data encrypted by the data owner, or a sum of fresh ciphertexts, which includes re-encrypted ciphertext, $C_R = ((E, F, G), (\tilde{E}, \tilde{F}, \tilde{G}))$. Also, the decryption key can include a secret key, $sk = ((a, b, g), (\tilde{a}, \tilde{b}, \tilde{g}), p_1)$ of the data owner or a secret key of the user, depending on the ciphertext to be decrypted. A user or data owner submits (block 112) a request for decryption of the ciphertext and a decode algorithm is accessed (block 113). A determination of the ciphertext type is made, including whether the ciphertext is fresh or a sum of fresh ciphertext, such as the re-encrypted ciphertext. In one embodiment, the ciphtertext can be classified automatically or alternatively, the classification type can be input by an individual or other user.

If the ciphertext is fresh, the oracle generated during set-up is accessed (block 114) and a first part of the fresh ciphertext is processed (block 115) via the oracle and a Decode algorithm. Specifically, the first part of the fresh ciphertext $C_1 = (W, X, Y)$ is used to compute the following:

$$\frac{Y}{W^{1/a} X^{1/b}},$$

where a and b are obtained from the secret key.

Figure 5:
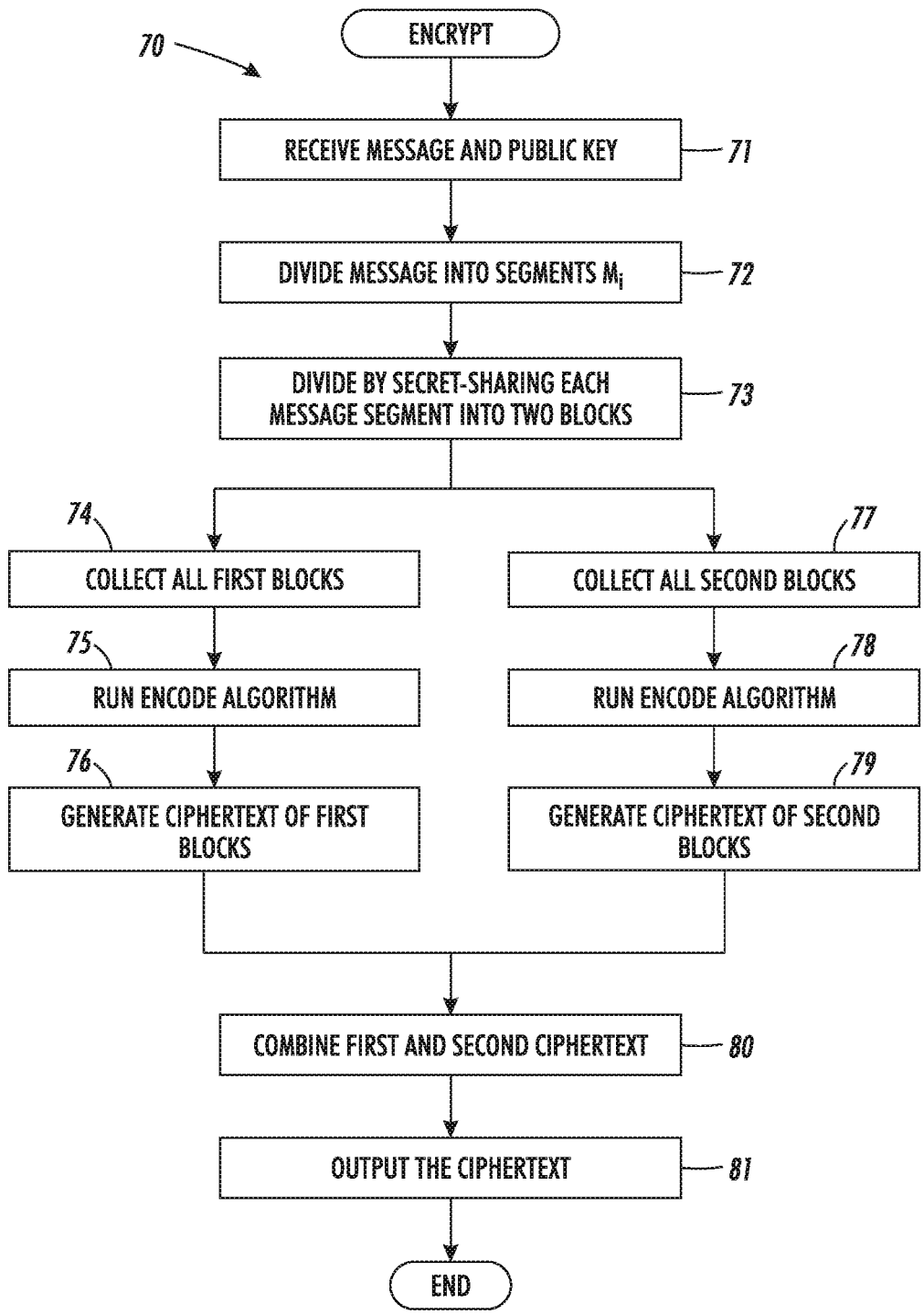
FIG. 5 is a flow diagram showing, by way of example, a process for encrypting data using the public key of FIG. 4.

Once the values of W, X, and Y, which are provided above with respect to FIG. 5, are entered, the equation appears as follows:

$$\frac{g^{r+s} \cdot \text{Encode}(\{h_i\}_{i=0}^{k-1}, (m_0[1], \ldots, m_{k-1}[1]))}{g^r \cdot g^s} =$$

$$\text{Encode}(\{h_i\}_{i=0}^{k-1}, (m_0[1], \ldots, m_{k-1}[1]))$$

The oracle is queried via the encode algorithm and $$\frac{Y}{W^{1/a} X^{1/b}}$$

is input into me oracle, which outputs (block 116) the first message blocks $M_i^{[1]}$ associated with the first part of the ciphertext using the decode algorithm below:

$$\text{Decode}(0, 2^\omega - 1, p_1, \{h_i\}_{i=0}^{k-1} inp),$$

where $p_1$ is a private parameter and $h_i$ includes public parameters, both of which are discussed above with respect to FIG. 3. Further, the minimum i=0 and maximum k−1 parameters of the decode algorithm represent an expected range of original plaintext values, $2^{\{k(w-1)\}}$. Output of the oracle includes plaintext of the first blocks of the message segments $(m_0[1], \ldots, m_{k-1}[1])$.

Simultaneously to or asynchronously to processing of the first part of the ciphertext, processing (block 117) of the second part of the ciphertext $C_2 = (\tilde{W}, \tilde{X}, \tilde{Y})$ can occur via the Decode algorithm, without the oracle. Specifically, the following is computed using the second part of the ciphertext, as follows:

$$\frac{\tilde{Y}}{\tilde{W}^{\tilde{a}-1} \tilde{X}^{\tilde{b}-1}}$$

Once the values of $\tilde{W}$, $\tilde{X}$, and $\tilde{Y}$, which are provided above with respect to FIG. 5, the equation appears as follows:

$$\frac{\tilde{g}^{\tilde{r}+\tilde{s}} \cdot \text{Encode}(\{f_i\}_{i=0}^{k-1}, (m_0[2], \ldots, m_{k-1}[2]))}{\tilde{g}^{\tilde{r}} \cdot \tilde{g}^{\tilde{s}}} =$$

$$\text{Encode}(\{f_i\}_{i=0}^{k-1}, (m_0[2], \ldots, m_{k-1}[2]))$$

Subsequently, the Decode algorithm is run as provided below:

$$\text{Decode}(0, 2^\omega-1, p_2, \{f_i\}_{i=0}^{k-1}), \text{Encode}(\{f_i\}_{i=0}^{k-1}, (m_0[2], \ldots, m_{k-1}[2]))$$

Results of the Decode algorithm include plaintext of the second blocks (block 118) of the message segments, $(m_0[2], \ldots, m_{k-1}[2])$. Finally, the plaintext of the first and second blocks of the message segments are combined (block 119) as the decrypted message, which is output (block 120) to the user for processing and analysis, such as for conducting market research or identifying behavior trends and patterns.

If the ciphertext is determined to be a sum of freshly generated ciphertext, such as the re-encrypted ciphertext, decryption can be performed as provided above, except that the minimum and maximum parameters in the decode algorithm are computed based on the expected range of plaintext messages in the original fresh ciphertexts and a total number of such fresh ciphertexts added.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for protecting sensitive data via data re-encryption, comprising:
   a database to maintain encrypted data of a data owner, wherein the encrypted data comprises a property of supporting additions of plaintext underlying the encrypted data and is encrypted via a public key of the data owner;
   a processor to receive a query from a user and to identify at least a portion of the encrypted data that satisfies the query from the user;
   a server comprising a central processing unit, memory, an input port to receive the query, and an output port, wherein the central processing unit is configured to generate a re-encryption key for the identified portion of encrypted data using a public key of the user, a secret key of the data owner, and two random elements selected from a group of elements; and
   a further server comprising a central processing unit, memory, an input port to receive the identified portion of encrypted data from the database and the re-encryption key from the server, and an output port, wherein the central processing unit is configured to:
   re-encrypt the identified portion of encrypted data using the re-encryption key as re-encrypted data; and
   transmit the re-encrypted data to the user in response to the query.

2. A system according to claim 1, further comprising:
   a public key generator to generate public parameters for the user and generate the public key using at least one of the public parameters.

3. A system according to claim 1, further comprising:
   a secret key generator to generate private parameters for the user and compute a secret key for the user using at least one of the private parameters.

4. A system according to claim 1, further comprising:
   a message encryptor to encrypt each item of the encrypted data by dividing each data item into segments, further dividing each segment into two blocks comprising a first block and a second block, collecting the first block from each segment in the data item and generating ciphertext, collecting the second block from each segment in the data item and generating ciphertext, and combining the ciphertext from the first and the second blocks as an encryption of that data item.

5. A system according to claim 1, further, comprising:
   a re-encryption key generator to calculate the re-encryption key by parsing each of the secret key associated with the data owner and the public key of the user into two sections, selecting the two random elements, computing a first part of the re-encryption key based on one of the random elements, a first section of the secret key, and a first section of the public key, computing a second part of the re-encryption key based on the other random element, a second section of the secret key, and a second section of the public key, and combining the first and second parts as the re-encryption key.

6. A system according to claim 1, further comprising:
   a key access module to identify the user of the query and access the re-encryption key associated with the identified user for re-encryption.

7. A system according to claim 1, further comprising:
   a re-encryption module to perform the re-encryption on one such encrypted data item of the identified portion of the encrypted data by splitting the encrypted data item into two parts, computing a first re-encryption component using elements from the re-encryption key and the first part of the encrypted data item, computing a second re-encryption component using elements form the re-encryption key and the second part of the encrypted data item, and combining the first and second re-encryption components as the re-encrypted data item.

8. A system according to claim 1, wherein the re-encrypted results comprise ciphertext different from ciphertext of the encrypted data.

9. A system according to claim 8, further comprising at least one of:
   a decryption module to decrypt the re-encrypted ciphertext of one such data item by dividing the re-encrypted ciphertext into two parts, applying an oracle and a decode algorithm to the first part and the decode algorithm to the second part and combining the first and second parts as the ciphertext of the encrypted data item.

10. A computer-implemented method for protecting sensitive data via data re-encryption, comprising:
    maintaining encrypted data of a data owner, wherein the encrypted data comprises a property of supporting additions of plaintext underlying the encrypted data and is encrypted via a public key of the data owner;
    receiving from a user a query;
    identifying at least a portion of the encrypted data that satisfies the query from the user;
    generating a re-encryption key for the identified portion of encrypted data using a public key of the user, a secret key of the data owner, and two random elements selected from a group of elements; and
    re-encrypting as re-encrypted data the identified portion of the encrypted data using the re-encryption key; and
    transmitting the re-encrypted data to the user as results of the query.

11. A method according to claim 10, further comprising:
generating public parameters for the user; and
generating the public key using at least one of the public parameters.

12. A method according to claim 10, further comprising:
generating private parameters for the user; and
computing a secret key for the user using at least one of the private parameters.

13. A method according to claim 10, further comprising:
encrypting each item of the encrypted data, comprising:
dividing each data item into segments;
further dividing each segment into two blocks comprising a first block and a second block;
collecting the first block from each segment in the data item and generating ciphertext;
collecting the second block from each segment in the data item and generating ciphertext; and
combining the ciphertext from the first and the second blocks as an encryption of that data item.

14. A method according to claim 10, further, comprising:
calculating the re-encryption key, comprising:
parsing each of the secret key associated with the data owner and the public key of the user into two sections;
selecting the two random elements;
computing a first part of the re-encryption key based on one of the random elements, a first section of the secret key, and a first section of the public key;
computing a second part of the re-encryption key based on the other random element, a second section of the secret key, and a second section of the public key; and
combining the first and second parts as the re-encryption key.

15. A method according to claim 10, further comprising:
identifying the user; and
accessing the re-encryption key associated with the identified user for re-encryption.

16. A method according to claim 10, further comprising:
performing the re-encryption on one such encrypted data item of the identified portion of encrypted data, comprising:
splitting the encrypted data item into two parts;
computing a first re-encryption component using elements from the re-encryption key and the first part of the encrypted data item;
computing a second re-encryption component using elements form the re-encryption key and the second part of the encrypted data item; and
combining the first and second re-encryption components as the re-encrypted data item.

17. A method according to claim 10, wherein the re-encrypted results comprise ciphertext different from ciphertext of the encrypted data.

18. A method according to claim 17, further comprising at least one of:
decrypting the re-encrypted ciphertext of one such item of the data, comprising:
dividing the re-encrypted ciphertext into two parts;
applying an oracle and a decode algorithm to the first part and the decode algorithm to the second part; and
combining the first and second parts as the ciphertext of the encrypted data item; and
decrypting the re-encrypted data via a secret key of the user.

* * * * *